United States Patent [19]

Altendorfer et al.

[11] Patent Number: 4,638,123

[45] Date of Patent: Jan. 20, 1987

[54] CIRCUIT ARRANGEMENT FOR A SMALL PABX WITH A SWITCHING MATRIX THAT HAS ELECTRONIC CROSSPOINTS

[75] Inventors: Alois Altendorfer; Ewald Dotzauer, both of Sauerlach; Wolfgang Mueller, Geretsried, all of Fed. Rep. of Germany

[73] Assignee: Siemens Aktiengesellschaft, Berlin and Munich, Fed. Rep. of Germany

[21] Appl. No.: 590,658

[22] Filed: Mar. 19, 1984

[30] Foreign Application Priority Data

Mar. 23, 1983 [DE] Fed. Rep. of Germany ....... 3310546

[51] Int. Cl.$^4$ .......................... H04M 7/14; H04Q 3/52
[52] U.S. Cl. .................................... 379/229; 379/284; 379/292
[58] Field of Search ........... 179/18 GF, 18 AD, 18 J, 179/18 ES; 340/825.85, 825.86

[56] References Cited

U.S. PATENT DOCUMENTS

| | | | |
|---|---|---|---|
| 3,832,495 | 8/1974 | Hovagimyan et al. | 179/18 GF |
| 3,904,831 | 9/1975 | Pommerening et al. | 179/18 GF |
| 3,993,873 | 11/1976 | Bogda et al. | 179/18 ES |
| 3,993,978 | 11/1976 | Hollis | 179/18 GF X |
| 4,113,989 | 9/1978 | Schneider | 179/18 GF |
| 4,236,049 | 11/1980 | Tanihata et al. | 179/99 R |
| 4,539,564 | 9/1985 | Smithson | 340/825.79 |

FOREIGN PATENT DOCUMENTS 2068684 8/1981 United Kingdom .

OTHER PUBLICATIONS

Article, "Stored Program Controlled PABX, ASB 20", by L. Nyberg, in Ericson Review, vol. 58, (1981), No. 1, pp. 30 to 37.

Primary Examiner—Thomas W. Brown
Attorney, Agent, or Firm—Thomas H. Jackson

[57] ABSTRACT

In a small PABX with a switching matrix that has electronic crosspoints, integrated selector components comprising multiplexers or demultiplexers in C-MOS technology are used for the switching matrix. By means of individual dialing connection points, which are determined by an appropriate control address supplied by a control computer unit, the individual subscriber lines are to be connected together in internal traffic, and the subscriber lines are to be connected with an exchange line in external traffic. The switching matrix is electrically separated from other operating units by repeating coils in the subscriber lines and in the exchange lines. Central units (tone receiver, tone generator) are connected through free dialing connection points of the multiplexers.

7 Claims, 5 Drawing Figures

| FIG. 1A | FIG. 1B |
|---|---|
| FIG. 1C | FIG. 1D |

CIRCUIT ARRANGEMENT FOR A SMALL PABX WITH A SWITCHING MATRIX THAT HAS ELECTRONIC CROSSPOINTS

BACKGROUND OF THE INVENTION

The invention relates to a circuit arrangement for a small private automatic branch exchange (PABX), in which, with the aid of a control computer unit that directs the switching processes and has access to memory units in which the information necessary for the switching processes is contained, internal and external connections are made possible by the interposition of an appropriate switching matrix with electronic crosspoints.

Through the use of a control computer unit, which can take the form of a microprocessor that operates together with the corresponding storage systems, a wide range of features can be obtained inexpensively in a small PABX. Examples of these features include abbreviated dialing, which enables authorized subscribers to establish a frequently used connection by dialing an abbreviated number or code, repeat dialing, by means of which the outside number previously dialed is called again, call-waiting signals which allow a person to draw attention to himself by actuating a tone when a line is busy, as well as call forwarding, in which an incoming call is routed to another predetermined subscriber station. These and other features can be changed by programming, which is accomplished with appropriate input keys, assuming that the system is software controlled. This allows the system to be easily and simply adapted or customized for the requirements of a particular user. In addition to electromechanical elements, semiconductor elements, such as field-effect transistors, are used as crosspoints in the switching matrix. Even when the switching matrix is constructed in a single stage, there are, as a rule, at least two crosspoints in series for any internal connection. If electronic crosspoints are used, it is possible, among other things, to reduce the noise generated in the PABX.

SUMMARY OF THE INVENTION

The object of the invention is to provide, at minimum cost, a circuit arrangement for a small PABX which simplifies the establishment of connections and which simplifies the switching units that are required to implement the connections.

This can be achieved with a switching matrix consisting of a number of integrated selector components equal to at least the sum of the number of outside connection lines and the number of the subscriber stations, with each component having several terminal connecting points—at least as many as there are subscribers—of the first kind (for example, outputs) and a terminal connecting point of the second kind (input) that is assigned to a subscriber station or connecting line. In addition, in the selector components, by means of control data fed to appropriate address inputs by the control computer unit, it is possible to select a terminal connecting point of the first kind and connect it with the terminal connecting point of the second kind. Each of the selector components assigned to the subscriber stations can be coupled through the terminal connecting point of the second kind (input) with one of the subscriber stations and through the terminal connecting points of the first kind (outputs) respectively with each of the other subscriber stations; each of the selector components assigned to an outside connection line can be coupled through the terminal connecting point of the second kind (input) with the connection line in question and through the terminal connecting points of the first kind (outputs) respectively with all the subscriber stations.

For the switching of the voice connections, selector components, such as conventional demultiplexer components are used. The individual connections are connected or put through according to the address information that is fed from the control computer unit to the corresponding selector inputs. The use of these standard components means that the system can be easily expanded without the necessity of having to do preliminary work for that purpose. For each subscriber station and for each outside connection line, the individual component switches with only one single crosspoint. Thus, from the point of view of transmission, one crosspoint is closed for every speech connection. The standard components used make it possible to construct a one-stage switching matrix in a simple manner, by means of which unlimited availability can be achieved. In the course of establishing the connection, devices must be switched on during specific phases of the switching for various purposes, such as evaluation and generation of tones. In refinements of the invention, these devices can also be switched, as central devices, to terminal connecting points of the individual selector components, which are not seized by subscriber stations. In the place of one component with the corresponding number of requisite terminal connecting points, it is also possible to accomplish the functional interconnection of two components with a low number of terminal connecting points, which allows the necessary number of terminals to be obtained again.

In one embodiment of the invention, the selector component assigned in each case respectively to the outside connection lines can be connected through a terminal connecting point with a terminating resistor whose impedance is correlated to the specific nature of the line. By introducing a resistor of this kind at a terminal connecting point that is not seized by a subscriber station, it is also possible to use the selector component to close the subscriber station during the call-back state of a speech connection and in the pauses that occur intermittently at the beginning of a seizure.

According to another embodiment of the invention, those devices which permit the additional functions necessary in a specific switching phase can be switched on as central devices through additional selector components in each case. For this switching on, as well as for the construction of the switching matrix, appropriately integrated C-MOS components should be used.

According to another embodiment of the invention, a repeating coil is used as a connecting element between the switching matrix and the outside connection lines, as well as the subscriber line circuits, so that in case an unequal number of windings is selected for the primary and secondary side of each repeating coil, the side with the higher number of windings is in each case connected with at least one terminal connecting point of one of the selector components used to construct the switching matrix. By using a repeating coil, the feed voltage is uncoupled from the components. By increasing the transformation ratio of the repeating coil, particularly when C-MOS components are used, it is possible to reduce the net loss. As a result, any attenuation correction that might have to be carried out—for example, .

due to the introduction of additional amplifiers—can be dispensed with.

Other features and advantages of the present invention will become apparent from the following detailed description, and from the claims.

For a full understanding of the present invention, reference should now be made to the following detailed description and to the accompanying drawings.

DETAILED DESCRIPTION

Figures 1, 1D:
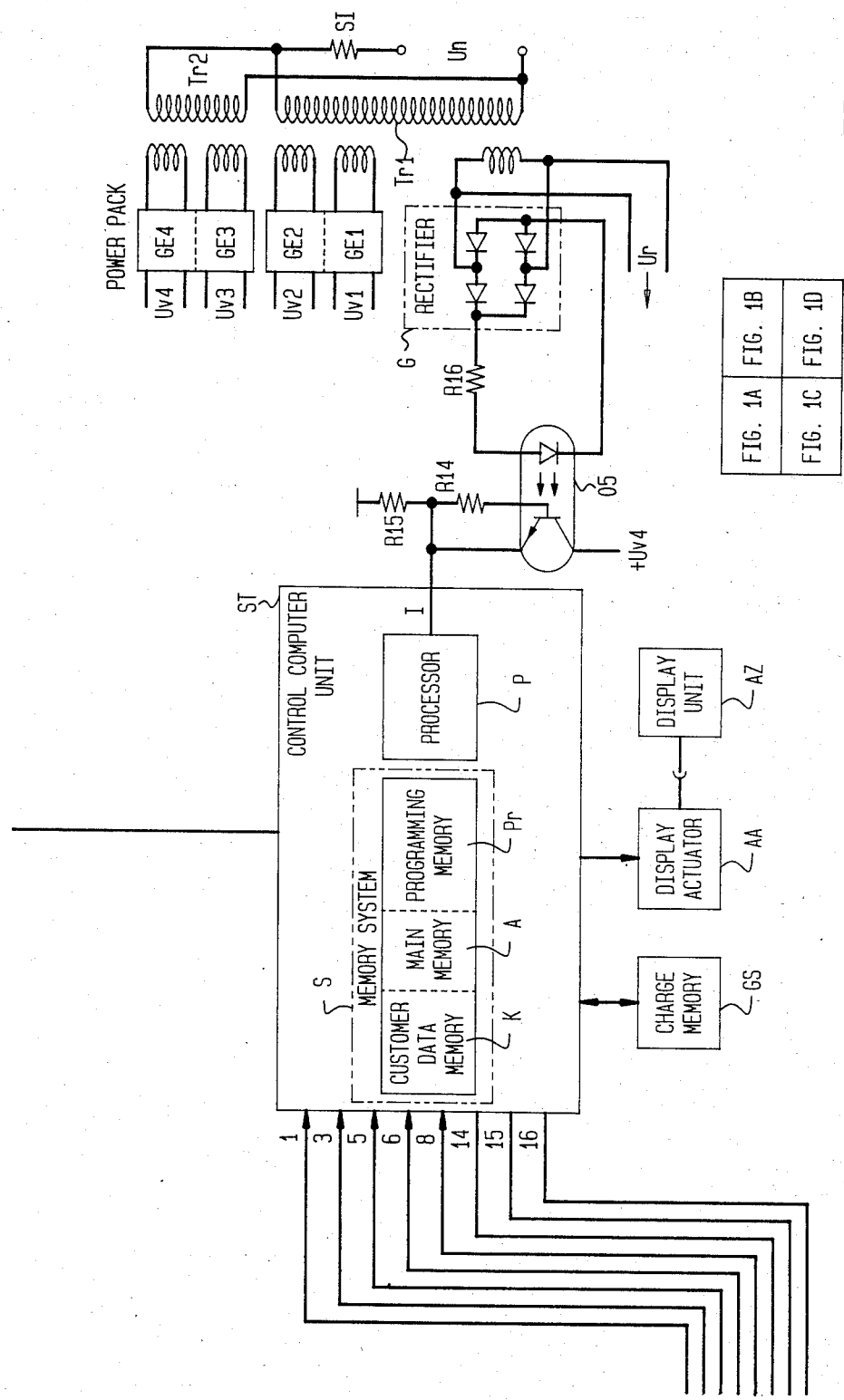
FIG. 1 is a key figure showing the arrangement of FIGS. 1A–1D.
FIGS. 1A through 1D, taken together, show diagrammatically a small PABX incorporating a preferred embodiment of the invention.
Figure 1A:
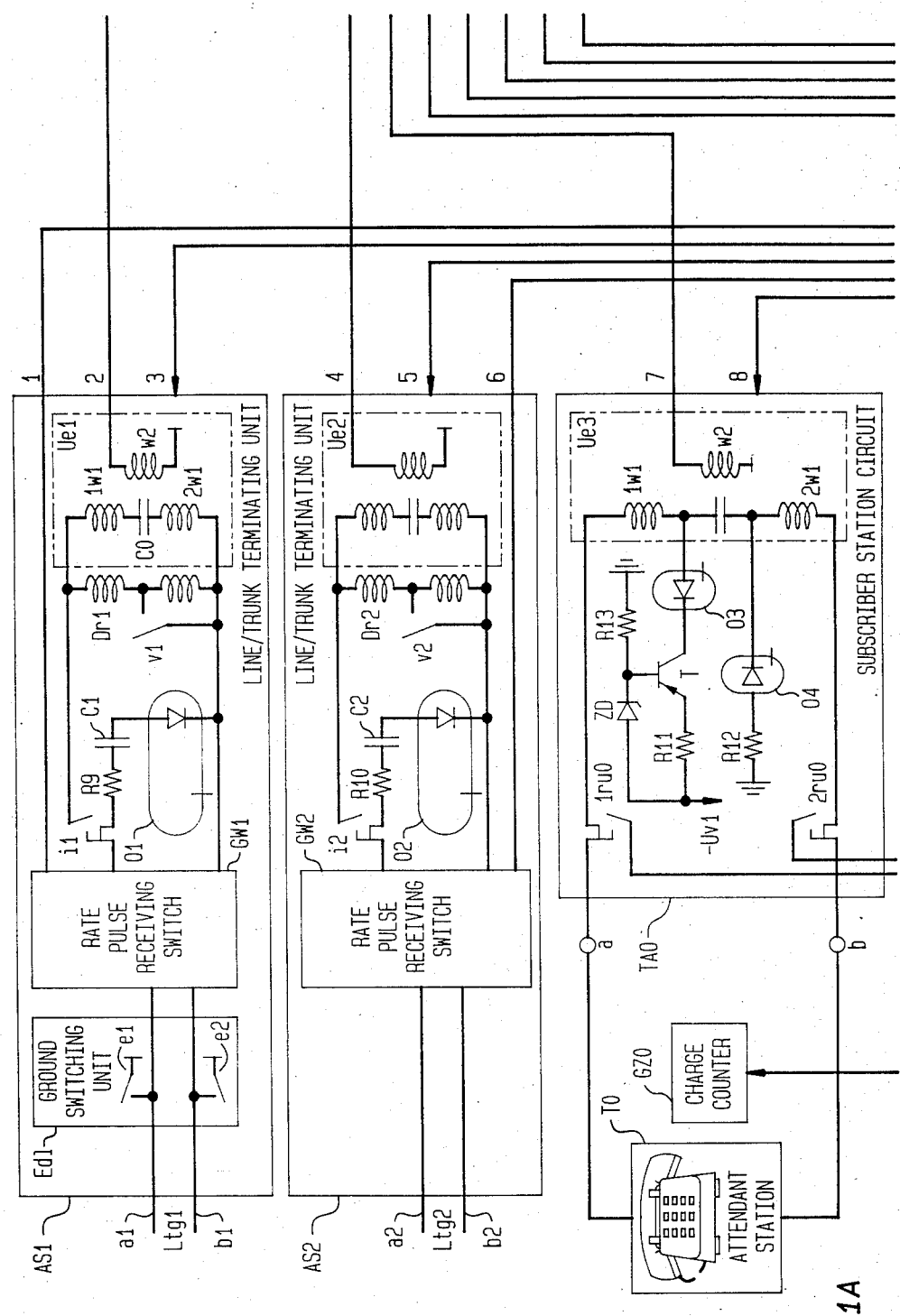
Figure 1B:
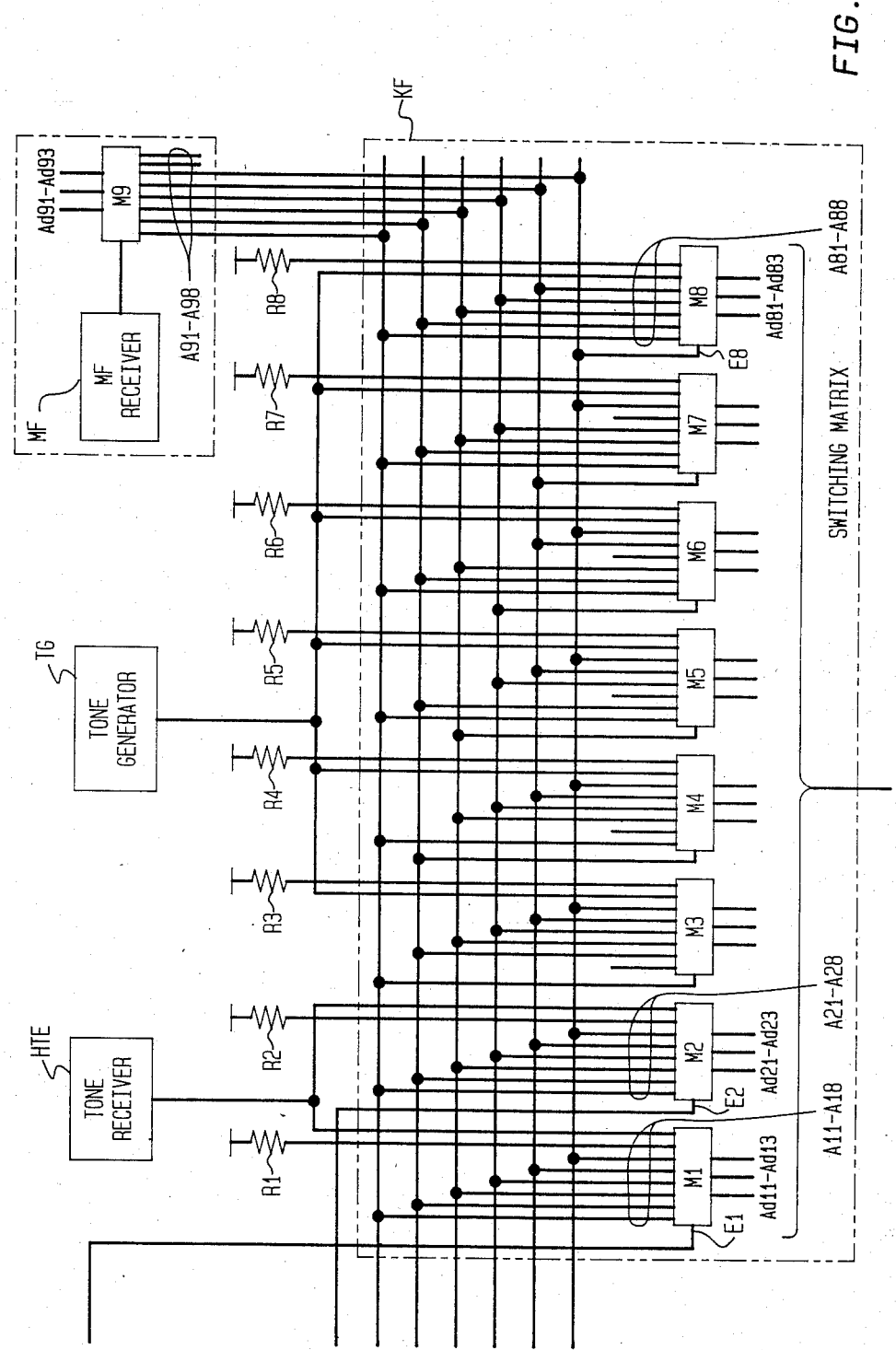
Figure 1C:
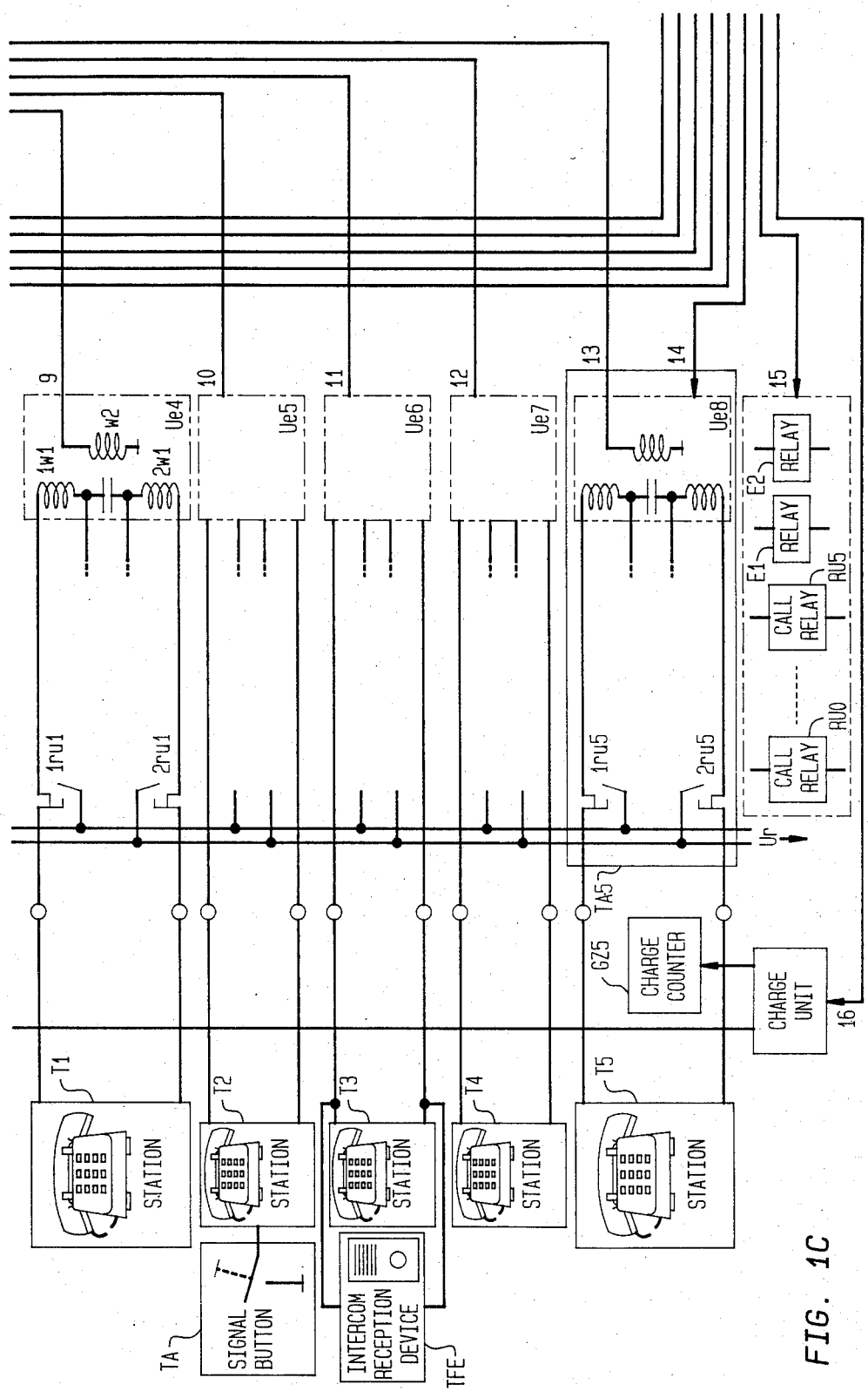

The small PABX shown in the figures should have the internal and external connection options that are provided for systems of this type. With the software controlled system on which it is based, a number of features can be easily realized. Some of these typical features are abbreviated dialing, repeat dialing, switching on, dialing control and call forwarding. Of the great number of operating possibilities for a small PABX of this kind, the selective structural representation will be used to explain only those that are essential in the prescribed context.

According to the level on which it is constructed, the small PABX can be connected with other exchanges through one or more outside lines. In the embodiment, two outside lines of this kind, namely lines Ltg1 and Ltg2, have been provided. These function as exchange lines to connect the PABX with the public network. At least one of the available outside lines can also connect the PABX with another PABX to provide for so-called tie-line traffic. If the PABX is used as a second PABX, then the connection to the first PABX is made by means of a so-called branch line.

The connections to the public network are made through the first PABX as the main exchange. In the case of telephone traffic over a branch line it is necessary, for specific switching procedures, to connect a ground to the line to the respective opposite exchange. This is accomplished through contacts e1 and e2, belonging to ground switching unit Ed1. In the case of an exchange line, these contacts are not necessary. Each outside line Ltg1 or Ltg2 is assigned to line/trunk terminating unit AS1 or AS2 respectively. If connections to the public network can be established through these lines, then these terminating units are so-called exchange line groups, which contain a rate-pulse receiving switch GW1 or GW2. The incoming rate pulses are recognized by means of an appropriate scanning by control computer unit ST, which is responsible for the entire control of the switching operation. The pulses can be registered separately for each line and/or for each subscriber station, and can be stored as the respective total charge in charge memory GS. It is also possible to generate, with each counting pulse, a one-ahead pulse for a charge counter GZ assigned to the respective subscriber station.

Every terminating unit AS1 or AS2 contains a call bridge, consisting of resistor R9, capacitor C1 and optocoupler O1 or resistor R10, capacitor C2 and optocoupler O2 respectively, and the so-called exchange holding coil Dr1 or Dr2. The winding of the exchange holding coil is divided in two parts, with one part of the winding being bridged by an appropriately activated contact v1 or v2 during the dialing pulse. In the event that no multi-frequency code dialing is provided for the establishment of an external connection through an outside line, the dialing pulses are fed in effectively through contact i1 or i2. The activation of these pulse contacts is produced by control computer ST on the basis of the dialing information that is fed in by a subscriber. The evaluation circuit of optocoupler O1 or O2 that is contained in each call bridge is not shown in greater detail. This evaluation circuit, which contains the phototransistor of the respective optocoupler, is likewise continuously scanned, so the charge in its condition resulting from an incoming call can be registered by the control computer. Accordingly, the following operating steps can be effected. Line/trunk terminating unit AS1 or AS2 is cut off from switching matrix KF with a repeating coil Ue1 or Ue2. The speaking wires a1 and b1 are connected with one another, with reference to the line Ltg1, in a conventional manner through windings 1w1 and 2w1 and through capacitor C0. The connection with the switching matrix is effected through winding w2. Repeating coil Ue2 which closes line Ltg2 operates in a similar manner.

The units of the small PABX shown in the figures are divided into assemblies that can be plugged into one another. As a result of this kind of modular construction, it is possible to achieve the best possible adaptation to the various requirements of the user of the exchange. Shown here is a model with a total of six subscribers stations, consisting of an attendant's set T0 and five other subscriber stations T1 to T5. Instead of a subscriber station, it is possible as shown in the figures, to provide an intercom and reception device TFE which can permit access to an area, for example by electrically releasing a door lock. If the units that are required for a specific number of subscriber stations, such as for three subscriber stations (namely terminal circuit TA assigned to each subscriber station and the corresponding parts of switching matrix KF), are consolidated in a plug-in unit, then it is possible to easily and simple change the construction as the need arises. In the arrangement shown, it is possible to conduct simultaneously at least two outside calls, incoming and outgoing, with one call-back conversation each, as well as an inside conversation.

The switching matrix KF for putting through the individual speech circuits is constructed with selector components. Each outside line and each subscriber station T0 to T5 has assigned to it a selector component of this kind. For this purpose, a highly integrated conventional C-MOS component, which makes possible a demultiplexing operation, can be used. One such device that may be applied is the Motorola MC 14051-B 8 channel analog multiplexer and another the Texas Instruments TR 4051A, each of which can terminate six subscribers as follows. The number of terminals for the dialing lines must be at least equal to the number of subscriber stations available in the final model. Since the embodiment provides for a total of six subscriber stations, the above-mentioned standard component with eight terminal points that can be selected is used. The two terminals that are not required for the subscriber stations are connected in some other way. When there is a larger number of subscriber stations, a component with a sufficient number of terminals must be chosen, or else the number of terminals can be increased by connecting another component to the one that is insufficient in terms of its terminal capacity.

Components M1 and M2 are assigned to outside lines Ltg1 and Ltg2. The switching matrix side of repeating coil Ue1 or Ue2 is connected with input E1 of selector component M1 or with input E2 of selector component M2, respectively. One output of each of these components is coupled in the same way with a subscriber line. Of the eight outputs A11 to A18 of selector component M1 and the eight outputs A21 to A28 of selector component M2, the outputs A11 to A16 and the outputs A21 to A26 are therefore connected directly in each case with one of the subscriber stations T0 to T5. This is again accomplished through the winding, located on the switching-matrix side, of a repeating coil that closes the subscriber line. With reference to the individual subscriber stations, these are repeating coils Ue3 to Ue8, each of which belongs to one of the subscriber station circuits assigned to the various subscriber lines (in other words the subscriber station circuits TA0 to TA5). With the exception of the subscriber station circuits TA0 and TA5, the other components are neither especially emphasized nor designated as an operating unit in the figures.

One of the selector components M3 to M8, which are of the same type as the selector components M1, M2, is assigned to each of the subscriber stations T0 to T5. With the exception of selector component M8, their inputs and the terminals at the outputs are not shown in greater detail. Input E of each one of these selector components M3 to M8 is coupled with a subscriber station. (Only EB is designated). This is again accomplished by switching it to the winding on the switching-matrix side of the repeating coil that closes the subscriber line. The input of selector component M3 is accordingly connected with the corresponding winding of repeating coil Ue3 and the input of selector component M4 with the correspondent winding of repeating coil Ue4. The same procedure applies to selector components M5 to M8. Each of the selector components M3 to M8 is coupled through its output terminal with the subscriber station with which it is not coupled at the input. For example, selector component M3, which is coupled at its input with subscriber station T0, is connected through five individual outputs with the remaining subscriber stations, that is, with subscriber stations T1 to T5, in the manner already described. The same procedure applies to the other selector components. The desired output, which is to be connected for each selector component with the input, is selected by the following process: the corresponding binary-coded address is fed to respective address inputs Ad by control computer unit ST. For selector component M1, the address inputs are designated by Ad11 to Ad13. The same applies to the address inputs of the other selector components. Accordingly, in order to establish a speech connection, only one crosspoint need be switched, both for an internal and an external connection. At least two other terminals, to be selected in the same manner, of each selector component of the switching matrix can be advantageously connected with a terminating impedance or with a central unit that is to be effectively applied to a line in specified switching phases. The terminating impedance for outside lines Ltg1 and Ltg2 is designated by R1 or R2. In specified switching phases, it is then necessary to effectively switch on one of the terminating impedances R3 to R8 through the other selector components. This is always commanded by control computer unit ST when no other line termination is available. In the case of an exchange line, this situation occurs, for example, when the subscriber conducting an outside call has established a call-back connection. Then, as long as the exchange line is in the waiting state, the terminating impedance R1 or R2 is effectively switched on. This switching on of a terminating impedance also takes place after a subscriber has picked up the receiver, in those phases of call completion in which, as in the dialing pauses, no closing unit is effective. By switching on a terminating impedance, it is possible to prevent singing noises caused by feedback due to the amplifiers that are located in the lines or in the subscriber station.

By means of an appropriately installed selector component, it is also possible to couple a central device, such as tone receiver HTE or tone generator TG to an outside line or to a subscriber line. With the aid of tone receiver HTE it is possible to recognize an audible tone on the line. Such an audible tone might, for example, be a busy signal or a dial tone. The registration of the dial tone is necessary when a connection is automatically made, as in the case of abbreviated dialing. The tones to be introduced in an internal speech connection during certain switching phases are provided by tone generator TG, which is appropriately clocked, after it has been switched on throiugh the applicable selector component, by control component unit ST. The small PABX shown in the figures is designed to accomodate pushbutton dialing according to multi-frequency or pulse dialing processes, or to the dial switching system. Subscriber stations T0 to T5 can accordingly be equipped with pushbuttons and/or dials. If it is determined by the control computer unit ST, on the basis of an appropriate scanning of the states of the lines, that a subscriber station equipped for the multi-frequency dialing process wants to establish a connection, then a multi-frequency code receiver MF is switched in until the dialing is completed. This is accomplished through another selector component M9, which is adjusted on the basis of the information fed to its address inputs Ad91 to Ad93 by the control computer unit, so that one of outputs A91 to A98 is activated, and the multi-frequency code receiver MF is connected effectively with the line in question. The dialing information received by device MF in each case is transmitted to control computer unit ST, so that it can command the necessary follow-up operations. If an outside connection is desired, an appropriate relay is given the command to activate pulse dialing contact i1 or i2.

As has been mentioned above, the signals received over the outside lines, as well as the signals proceeding from the individual subscriber stations T0 to T5, are recognized by regular scanning of the appropriate receiving elements over bus lines 3, 5, 8, 14, 15, etc. connected with the outside lines or the subscriber sets, by the control computer unit. This control computer unit ST which is responsible for the entire control of the switching operations, consists of processor P and memory system S. In program memory Pr are stored the programs required to carry out the logic connections and processes relating to switching, operation, safety, and security. In main memory A are stored short-term data, such as the state of the connecting links, the state of the loop in the subscriber line and the numbers dialed. The customer data memory K contains the long-term data. On the basis of a predetermined data record, the content of the memory is changed to suit the customer's requirements, at least when the PABX is put into service. This change is accomplished by means of operating orders in the exchange which are fed in through the telephone set T0 at the switchboard. This can take place, for example, after releasing the change lock supplied for the customer data memory. These individual data might relate to the number of subscribers, their authorizations and abbreviated dialing destinations. Since these data should not be lost in the event of a voltage failure, they are stored in a solid-state memory that is programmed and erased electrically. They will be retained, even in the absence of voltage, until they are overwritten with new data. The charge memory GS in which the rate pulses are totaled separately for each subscriber station and/or for each outside line, can also be constructed as part of the customer data memory.

The input data for processor P includes among other things data concerning the state of the telephone stations or sets. It then compares these new data with the data most recently stored, thereby recognizing changes in state, and accordingly calls up for processing the programs assigned to such changes. This processing can then produce as its result output data in the form of control commands for concrete components. These control commands might for example, have the effect of activating relays.

The data generated by the operating activities of a subscriber, which determine the switching processes, are picked up from the subscriber line. This capability is illustrated by way of example on subscriber line TA0, which is assigned to subscriber station T0. The closing of the line loop, the activation of the ground button, and if the pulse dialing process is used, the number dialed must all be recognized. For this reason, an evaluation branch is coupled to each of line wires a and b. Each of these evaluation branches contains optocoupler O3 or O4. The logic state of each optocoupler is recognized by the control computer unit, through the regular scanning of its secondary circuit, which is not shown. All that is shown of each optocoupler is its component diode. The internally generated feed voltage $-Uv1$ is applied to the line branch that is coupled with line wire a. To the other branch, a compensating voltage, in the form of the ground potential, is applied through resistor R12, which is included for reasons of symmetry. By means of the elements contained in the first of the abovementioned branches, in addition to optocoupler O3, namely transistor T, resistor R11, Zener diode ZD, which supply a reference voltage, and resistor R13, the current on the line is kept to a predetermined value even in the event of a short circuit. If the loop is closed at the subscriber station, the current flows through both optocouplers O3 and O4. If the grounding key or the signal button that functionally corresponds to it, which is shown for subscriber station T1 and is designated by TA, is activated, then the current flows through only one optocoupler (namely optocoupler O4). When the assigned line loop is interrupted, both optocouplers become inactive. The states described above are recognized by the scanning of the optocoupler states by control computer unit ST and converted into the requisite switching operations. In this manner, the logic states of the various stations are respectively evaluated. When it is recognized that a grounding key has been pressed, it is determined whether the subcriber in question means to make an outside call, to answer an incoming outside call or to use the call-back service. In order to call the subscriber who is desired for the speech connection, the control computer unit activates call relay RU which is individually assigned to that subscriber. Thus, if one of the call relays RU0 to RU5, for which miniature relays are used, is activated by an appropriate control signal, then the internally generated call voltage Ur is applied through contacts 1ru and 2ru belonging to the respective call relays. For the attendant's station T0, the call voltage is effectively applied through contacts 1ru0 and 2ru0, which are activated in the rhythm of the call signal. The procedure is similar for the other subscriber stations.

For the small PABX shown in the figures, a so-called internal station or set such as a particular attendant station can be dispensed with, since the tasks that would otherwise be assigned to such a connector station or set are performed by the respective subscriber line in connection with control computer unit ST. Each subscriber has, as mentioned above, an individual feed current circuit, and the information about the subscriber's behavior is reported by means of cyclical scanning to the central control computer unit. The tones that are necessary in certain phases of switching are fed to the subscriber line, and by it to the subscriber station, through the coupling component required in each case and the respective repeating coil. In order for the nature of the tone to be determined by the control computer unit, the tone generator is effectively turned on by means of appropriate signals for the coupling component.

Each terminal unit that is assigned to an external line and each subscriber line that is assigned to the subscriber stations T0 to T5 contains repeating coil Ue. Particularly when selector components constructed in C-MOS technology are used for the switching matrix KF, there is a high net loss for the respective crosspoint that is switched. In order to improve the transmission, the ratio of the number of windings on the two sections of the repeating coil to one another is chosen to be other than 1:1. The section of a given repeating coil that is connected with the coupling components has a higher number of windings than the other section that is connected to the line. If the transformer ratio is 1:2, for example, it is possible to substantially improve the unfavorable transmission characteristics of a switched crosspoint that are caused by the components. The repeating coil thus serves not only to cut off the feed voltage from the switching matrix, but also due to the unequal number of windings on its primary and secondary sections, it permits the alternating speech voltages to be transmitted with a sufficiently low attenuation, assuming that the feed voltage has been suitably selected. Without this special choice of the transformer ratio, expensive measures, such as the introduction of additional amplifiers, would be required in order to provide an automatic attenuation compensation. The terminal of the section of each repeating coil Ue1 to Ue8 that is on the switching matrix side and is not connected with one of the coupling components M1 to M8, is connected by means of a joint wire to a specific reference voltage (e.g. the earth's potential or ground). The other terminal of each of these coil sections is connected, as has already been described, with an output of certain coupling components of the switching matrix. This matrix is constructed on a single level, and full availability is achieved. For the small PABX, at least one display unit AZ is provided which is usually placed directly beside a subscriber station or preferably the switchboard. It is also possible to have several display units at various locations. A display unit can take the form of a multiplace so-called seven-segment display. A display unit of this kind is controlled by control computer unit ST through a display activation assembly AA. Within this assembly the display information provided by the control computer unit is converted into the code necessary for the direct control of the display unit and temporarily stored so that it can be adjusted to the other's processing speed. By means of this display unit both information that is independent of the operating state and information directly relating to the operating state can be presented. Accordingly, the total charges that have accrued for a given set, and, if desired, the total charges per exchange line can be called up by a subscriber and displayed. The respective updated total charges are contained in memory unit GS, with the change in the charge data that is necessary after every outside call being effected by the control computer unit. In this connection it should be mentioned that charge counter GZ, that is assigned to a given subscriber station, receives the DC voltage pulses that are required to control it through unit GA. In this unit the control pulses supplied by the control computer unit for each registered counting pulse are converted into pulses suitable for controlling the counters. They are then transmitted over a separate line provided for each counter. In addition, it is possible with the aid of this display to review the call-number destinations contained in the corresponding abbreviated dialing number memory and to check any charge that may have been made. The displays described above can be produced by the choice of a specific code number assigned to each one of them. The choice can be made, for example on the switchboard.

Operating information can also be presented by display unit AZ. Thus it is possible to indicate the seizure of the available outside lines or the internal channels. Each place of the multiplace display unit and/or a predetermined combination of places can designate a specific type of connection. On the supposition that according to a specific configuration level provided by the administration, two outside connections and one internal connection can exist simultaneously, it can be arranged to have the first place on the display unit always indicate, with his call number, the subscriber who has a call connection on exchange line 1, and the second place on the display unit indicate the subscriber who has a call connection on exchange line 2. In this case it is assumed that the total number of subscriber stations permits single-digit call numbers. The third and fourth place of the display can then indicate the two subscribers who are making an internal call. The fifth place could be used to indicate the seizure of a line leading to a special terminal, such as intercom and reception device TFE. It can be arranged to have in principle a constant display of the seizure situation and to have the abovementioned display of the data that are independent of the operation situation, such as the charges and call number destinations, take place in response to a special command. It is also possible to have the presentation of each of the types of display mentioned above take place in response to a special command.

With the program-controlled system on which the small PABX is based, a wide range of features can easily be provided. The scope of individual features can be determined by a command to be fed in each case. It can be provided that specific switching procedures that relate to individual features are effected only after a predetermined period of time has elapsed after the respective command has been given. This period of time is not determined here as a fixed period by, for example, the discharge of a capacitor; instead, it is possble to adjust the procedures in question to the requirements existing in each case by allowing a flexible, adjustable time. Such procedures which are effected on the basis of specific timing include, for example, call forwarding and night switching and the reversal of a call connection if the call is not picked up on the station or set which has been dialed, after it has been transmitted as intended.

For the individual exchange, the desired time can be written into customer data memory K by means of a so-called operational input effected by a maintenance man or by the subscriber. This desired write-in procedure can be communicated to the control unit by dialing a number prescribed for that purpose. The specification of the desired time might be determined, for example, by taking the product of a predetermined base time and the number dialed next. Then, as a result the switching time for the automatic night switching and the time after which an unanswered outside call to the programmed set is forwarded will equal the value that has been stored by dialing. This time interval is called up in each case as it occurs by the control unit from the customer data memory.

The small PABX shown in the figures can also be used as a second PBX in connection with a main exchange. In this case, as a rule, it is connected to the main exchange in place of an extension. Assume that this is done through line wires a1 and b1 of line Ltg1. When a connection of this kind is made to a primary PABX, outside calls are always made through the latter exchange. In addition, conversations can be conducted with the subscribers in the primary PABX. This can take place even during an outside call. In order to make it possible for a subscriber in the second PABX to make a call-back, an auto-transfer or a seizure of an outgoing exchange line, it is necessary to ground the connecting line to the second exchange during the requisite switching procedures in each case. In order to call a subscriber in the primary PABX, it is necessary, after picking up the receiver, to press the grounding key provided at the subscriber station, for example, button TA at subscriber station T1. When this is done, the dial tone is received from the other exchange. After the number of the desired subscriber has been dialed, the connection is established when he/she answers. When it is desired to have a connection from the second PABX to an outside subscriber, it is necessary, just as in the case of an incoming call, to ground the connecting line in order to accomplish a call-back and any transfer or takeover that might be coupled with it. This is done by having the subscriber in the second PABX dial a code number in making the call-back. Thus, while in the case of calls from and to the main exchange, as well as in incoming and outgoing outside traffic, it is possible to initiate and cancel a call-back and transfer within the second PABX by pressing the ground button. For a call-back to be made in the main exchange with reference to an incoming or outgoing outside call, it is necessary for the subscriber in the second PABX, in addition, to dial a code number, or, if necessary, a combination of code numbers. This is recognized by the control computer unit on the basis of its scanning of the state of the line on the respective subscriber line. As a result of this, a shortterm control signal is supplied by the control computer unit for relays E1 and E2. This activates contacts e1 and e2, so that while they are closed, line Ltg1 that leads to the other exchange is grounded. At the same time, the evaluation of the code number that has been dialed automatically triggers the internal call-back that was originally initiated when the grounding key was pressed. The grounding of the outside line causes switching to call-back, for example, in the other exchange. Now if the number of the subscriber in the main exchange is dialed, the call-back connection with the subscriber is established. For the cancellation of a call-back, the same procedure must be followed as for its initiation. If the outside call is to be taken over by the subscriber in the main exchange, this can be accomplished by pressing the grounding key. The fact that the outside line is grounded by means of a dialed code number permits a simple and accurate evaluation.

The small PABX is fed through an adjustable power pack from the grid alternating current voltage Un. The feed voltages that are required for the various units and components of the exchange are derived from the partial alternating current voltages that are obtained from the grid alternating current voltage by transformation. In this case the generation of the partial alternating current voltages is distributed between two conventional transformers Tr1 and Tr2. By means of a distribution of this type over at least two transformers, it is possible to separate the voltages that are critical with regard to interference factors from the other voltages. This results simultaneously in a better power distribution and a more favorable heat distribution over the housing of the respective exchange. The distribution of the partial alternating current voltages over the two transformers, which is accomplished by element Si, might, for example, take place in such a manner that transformer Tr1 supplies the partial alternating current voltages that are necessary for the generation of the subscriber feed voltage and the feed voltage for the relays and other electrical components. From these partial alternating current voltages, the requisite direct current voltage is then supplied by an adjustable power pack GE1 or GE2. The voltage Uv1 can be the feed voltage required to supply the individual subscriber stations. The direct current voltage Uv2 generated from the other partial alternating current voltage can be used for the feed voltage of the electromechanical components, such as the relays. Transformer Tr1 is also responsible for generating the call alternating current voltage Ur, which is effectively applied through contacts to call relays RU that are individually assigned to the subscriber stations.

Transformer Tr2 is used to generate the partial alternating current voltages from which are derived the feed voltages for those units that should not be affected by voltage fluctuations that are caused by the subscriber's behavior. The two voltages Uv3 and Uv4 that are generated through power packs GE3 and GE4 from the corresponding partial alternating current voltages then might form, for example, the feed voltages for the integrated units. These units might consist of C-MOS coupling components M1 to M8 that are used to construct the switching matrix, as well as those units that make up control computer unit ST. The value of the direct current voltage Uv3 might, for example, be +5 volts and the value of the direct current voltage Uv4, +12 volts. Adjustable power packs GE1 to GE4 can be parts of a comprehensive power pack.

In order to prevent failures in control computer unit ST, the alternating current voltage is monitored to see whether voltage interruptions occur. In order to determine the existence of short-term interruptions, the grid alternating current voltage can be directly applied. In the embodiment the call alternating current voltage on the low-voltage side, which is equal to the grid voltage, is monitored, in order to recognize promptly those cases in which improper functioning is likely to occur as the result of an irregularity in the voltage. The monitored call alternating current voltage Ur controls optocoupler O5 through rectifier G. Full-wave rectification of the call alternating current voltage is meant, as indicated, to be accomplished by unit G, so that at the output, if the voltage is correct, pulses with a frequency of 100 hertz are generated. The diodes present in the optocoupler are accordingly modulated in this rhythm through resistor R16. The phototransistor included in optocoupler O5 as its output side, whose base circuit includes resistors R14 and R15, is, as shown, coupled on its emitter side with interrupt input I of processor P. As a result, an interrupt in a 100 hertz rhythm is ordinarily produced for the processor. The number of interrupts per unit of time is evaluated by programming techniques. If an insufficient number of interrupts occurs in the predetermined time unit, which might, for example, be equal to one period of the alternating current voltage, then it must be assumed that a failure of the feed voltage for the processor will occur within a short time. A reset pulse is generated for the processor, so that incorrect program execution is avoided. The charging capacitors contained in the respective power packs ensure that the feed voltage for the processor is maintained for a specified period of time after the failure. As a result, the generated reset pulse can continue to be effective so that the program execution can be set back to a predetermined starting point. The processor waits until the power is restored and then begins at the new starting place. The reset pulse can be used simultaneously to deactivate peripheral units, such as relays. A relay of this kind can, for example, be switched to the inactive state, switching off the respective assigned driver stage. As a result, certain functions whose execution is dependent on the activation of a relay cannot take place in an undesired manner. Thus, in the case of an electric door-opener that would otherwise be operated by the telephone, it is impossible for the door to be opened involuntarily as the result of a relay that has been activated when a failure occurs. If, over a prescribed time period, the correct number of voltage half-waves is registered, then the processor releases the peripherals and starts up the switching operations. The monitoring of the voltage also ensures that no malfunctions occur if the feed voltage passes through an inadmissible range.

There has thus been shown and described a novel circuit arrangement for a small PABX with a switching matrix that has electronic crosspoints, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a circuit arrangement for a small private branch switching exchange for connecting subscriber station lines and exchange lines having a control computer unit that directs the line switching procedures of the private branch switching exchange and has access to memory devices in which information necessary for the switching procedures is contained and directs internal and external connections by adjustment of a switching matrix with electronic crosspoints, the improvement comprising the switching matrix having a plurality of integrated selector components whose terminals at least equal the sum of the number of exchange lines and the number of subscriber stations, each of which selector components includes a plurality of terminals of a first kind, at least equal to the number of subscribers, and a single terminal of a second kind, which is assigned either to a subscriber station or to an exchange line, and on these selector components, based on control information fed to corresponding address inputs of a selector component by the control computer unit, a terminal is selected from the terminals of the first kind and connected with the terminal of the second kind, and each selector component, having its single terminal of a second kind assigned to a subscriber station, is coupled through the terminal of the second kind with the assigned one subscriber station and through the terminals of the first kind respectively with all other subscriber stations and each of the selector components, having its single terminal of a second kind assigned to an exchange line, is coupled through the terminal of the second kind with the assigned one exchange line and through the terminals of the first kind respectively with all the subscriber stations.

2. The circuit arrangement according to claim 1, wherein the terminals of the first kind of the selector components assigned either to the exchange lines or to the subscriber stations, are switchably connected, in the course of establishing a connection, to devices required during certain switching phases as supplemental central devices.

3. The circuit arrangement according to claim 2, wherein devices that send or receive tone frequency signals are switchably connected as a central device.

4. The circuit arrangement according to claim 1, wherein the terminals of the first kind of a selector component having its single terminal of a second kind assigned to an exchange line are switchably connected to a terminating resistor whose value is selected for termination of the corresponding exchange line.

5. The circuit arrangement according to claim 1, wherein a device that permits additional functions to occur during a certain phase of the switching procedures in each case, is switchably connected as a central device through an additional selector component.

6. The circuit arrangement according to claim 1, wherein, a repeating coil is used as a connecting element between the switching matrix and the exchange lines, and a repeating coil that forms part, respectively, of each subscriber line is used as a connecting element between the switching matrix and the subscriber stations, so that an unequal number of windings is selected for the primary and secondary sections of each repeating coil, and either the primary or secondary section with the highest number of windings is connected with at least one terminal of one of the selector components.

7. The circuit arrangement according to claim 1, wherein the selector components comprise integrated C-MOS components.

* * * * *